(12) United States Patent
Disimile

(10) Patent No.: US 9,169,750 B2
(45) Date of Patent: Oct. 27, 2015

(54) FLUID FLOW NOISE MITIGATION STRUCTURE AND METHOD

(71) Applicant: Peter Disimile, Cincinnati, OH (US)

(72) Inventor: Peter Disimile, Cincinnati, OH (US)

(73) Assignee: ESI Energy Solutions, LLC., Cincinnati, OH (US)

( * ) Notice: Subject to any disclaimer, the term of this patent is extended or adjusted under 35 U.S.C. 154(b) by 0 days.

(21) Appl. No.: 14/341,775

(22) Filed: Jul. 26, 2014

(65) Prior Publication Data

US 2015/0047921 A1    Feb. 19, 2015

Related U.S. Application Data

(60) Provisional application No. 61/867,036, filed on Aug. 17, 2013.

(51) Int. Cl.

| | |
|---|---|
| *F01N 1/02* | (2006.01) |
| *E04F 17/04* | (2006.01) |
| *F01N 1/06* | (2006.01) |
| *F04B 11/00* | (2006.01) |
| *F02K 1/00* | (2006.01) |
| *F04B 39/00* | (2006.01) |
| *F01N 1/08* | (2006.01) |
| *F02K 1/82* | (2006.01) |
| *F01N 1/00* | (2006.01) |
| *E04F 17/00* | (2006.01) |

(52) U.S. Cl.
CPC .. *F01N 1/06* (2013.01); *F01N 1/08* (2013.01); *F02K 1/00* (2013.01); *F02K 1/827* (2013.01); *F04B 11/00* (2013.01); *F04B 39/00* (2013.01)

(58) Field of Classification Search
USPC .................. 181/250, 224, 225, 293; 415/119; 454/262, 906, 206
See application file for complete search history.

(56) References Cited

U.S. PATENT DOCUMENTS

| | | | | |
|---|---|---|---|---|
| 2,459,121 | A | * | 1/1949 | Willey et al. ................ 181/293 |
| 3,776,363 | A | * | 12/1973 | Kuethe ......................... 181/213 |
| 3,937,590 | A | * | 2/1976 | Mani ............................ 415/119 |
| 4,091,892 | A | * | 5/1978 | Hehmann et al. ............ 181/286 |
| 4,104,002 | A | * | 8/1978 | Ehrich ......................... 415/119 |
| 4,189,027 | A | * | 2/1980 | Dean et al. .................. 181/286 |

(Continued)

OTHER PUBLICATIONS

Peter J. Disimile, Norman Toy; Acoustical properties of a long rectangular cavity of constant cross-section immersed in a thick boundary layer, International Journal of Mechanical Sciences 46 (2004) 1827-1844.

(Continued)

*Primary Examiner* — Edgardo San Martin
(74) *Attorney, Agent, or Firm* — Michael C. Connelly

(57) ABSTRACT

The structure for the reduction of noise occurring when a fluid flow passes over a surface is disclosed by the present application. The structure comprises a surface with a top face that is roughly parallel to the flow wherein the face has an array of multiple separate and discreet cavities inset into the surface. Each cavity may be tuned to mitigate the noise of a specific frequency of the flow by altering the size, shape, position, angle in relation to the flow and ratios of depth, width, and length of the cavity. The cavities may be divided by partitions into sub-cavities of differing sizes, shapes and positions to mitigate noise as well. The structures may be applied to any application where a flow exists over a surface including, but not limited to, aerospace, automotive, naval and electronics. The structure may be flat, curved, tubular or any other shape subject to fluid flow.

20 Claims, 8 Drawing Sheets

(56) References Cited

U.S. PATENT DOCUMENTS

| | | | |
|---|---|---|---|
| 4,296,831 A * | 10/1981 | Bennett | 181/224 |
| 4,346,781 A * | 8/1982 | Ingard et al. | 181/206 |
| 5,250,764 A * | 10/1993 | Doychak et al. | 181/224 |
| 5,268,541 A * | 12/1993 | Pettersson | 181/224 |
| 5,276,291 A * | 1/1994 | Norris | 181/224 |
| 5,502,283 A * | 3/1996 | Ukai et al. | 181/228 |
| 5,696,361 A * | 12/1997 | Chen | 181/224 |
| 6,116,375 A * | 9/2000 | Lorch et al. | 181/224 |
| 6,199,657 B1 * | 3/2001 | Misawa et al. | 181/229 |
| 6,244,817 B1 | 6/2001 | Ngo | |
| 6,290,022 B1 * | 9/2001 | Wolf et al. | 181/292 |
| 6,309,176 B1 * | 10/2001 | Periyathamby et al. | 415/119 |
| 6,375,416 B1 | 4/2002 | Farrell et al. | |
| 6,379,110 B1 * | 4/2002 | McCormick et al. | 415/119 |
| 6,386,966 B1 * | 5/2002 | Kuwayama et al. | 454/139 |
| 6,450,289 B1 * | 9/2002 | Field et al. | 181/224 |
| 6,491,134 B2 * | 12/2002 | Ryan et al. | 181/295 |
| 6,508,331 B1 * | 1/2003 | Stuart | 181/250 |
| 6,607,432 B2 * | 8/2003 | Schaake | 454/143 |
| 6,609,592 B2 * | 8/2003 | Wilson | 181/292 |
| 6,719,078 B2 * | 4/2004 | Nakamura | 180/69.22 |
| 6,792,907 B1 * | 9/2004 | Kostun et al. | 123/184.57 |
| 6,811,372 B1 * | 11/2004 | Emborg et al. | 415/119 |
| 6,896,095 B2 * | 5/2005 | Shah et al. | 181/198 |
| 7,337,876 B2 * | 3/2008 | Larsen | 181/225 |
| 7,794,213 B2 * | 9/2010 | Gaude et al. | 417/312 |
| 7,891,464 B2 * | 2/2011 | Tang et al. | 181/225 |
| 8,485,310 B2 * | 7/2013 | Tanabe et al. | 181/225 |
| 8,511,426 B2 * | 8/2013 | Colam | 181/224 |
| 8,607,925 B2 * | 12/2013 | Gideonse | 181/293 |
| 8,641,494 B2 * | 2/2014 | Matthews | 454/262 |
| 2003/0072459 A1 * | 4/2003 | Cole et al. | 381/71.7 |
| 2003/0183446 A1 | 10/2003 | Shah et al. | |
| 2004/0076512 A1 | 4/2004 | Lata Perez | |
| 2005/0161280 A1 * | 7/2005 | Furuya | 181/225 |
| 2010/0278635 A1 * | 11/2010 | Schoeman | 415/119 |
| 2011/0002775 A1 * | 1/2011 | Ma et al. | 415/119 |

OTHER PUBLICATIONS

Peter J. Disimile, Xinwen Bai, Norman Toy; Pressure Oscillations Within a Yawed Rectangular Cavity in Subsonic Flow, International J. of Engg. Research & Indu. Appls., vol. 5, No. 11, pp. 27-50.

David G. MacManus, Diane S. Doran; passive Control of Transonic Cavity Flow, Journal of Fluids Engineering, vol. 130, Jun. 2008.

* cited by examiner

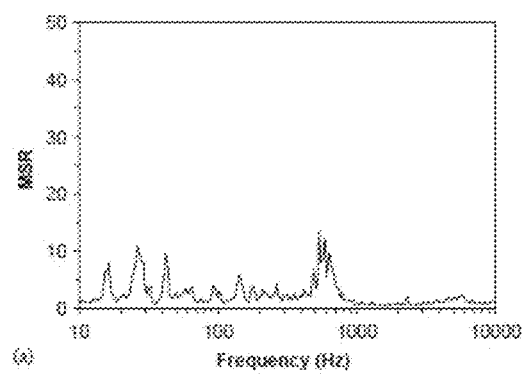
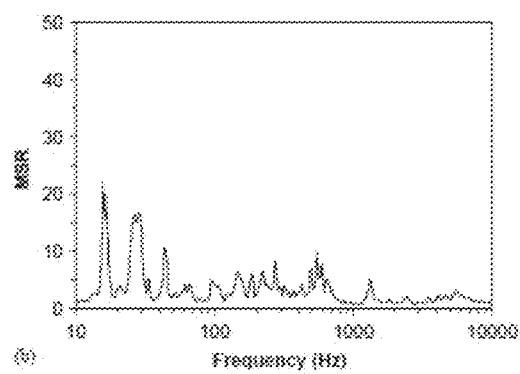
Fig. 5A    Fig. 5B
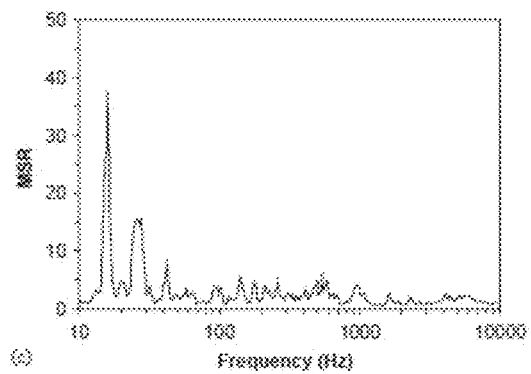
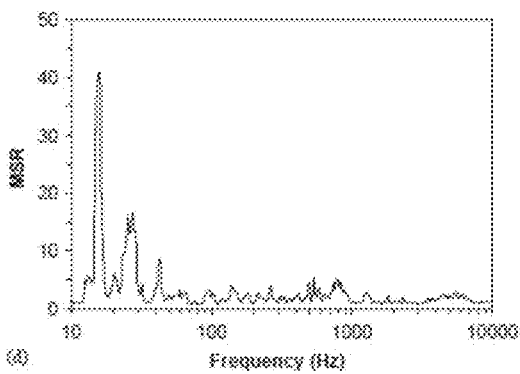
Fig. 5C    Fig. 5D
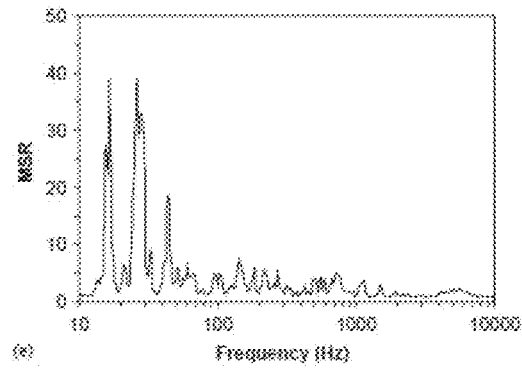
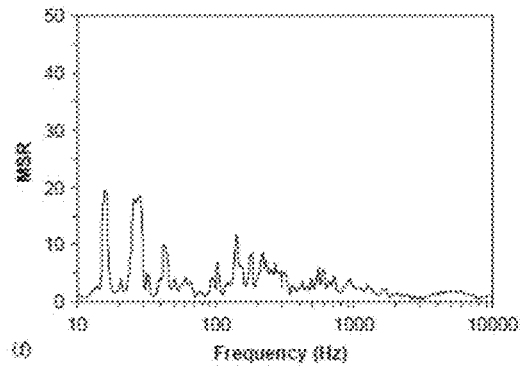
Fig. 5E    Fig. 5F

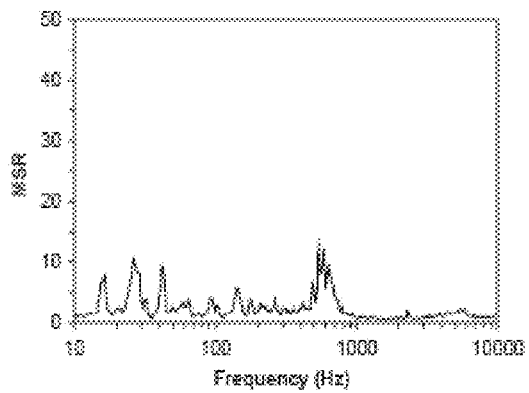 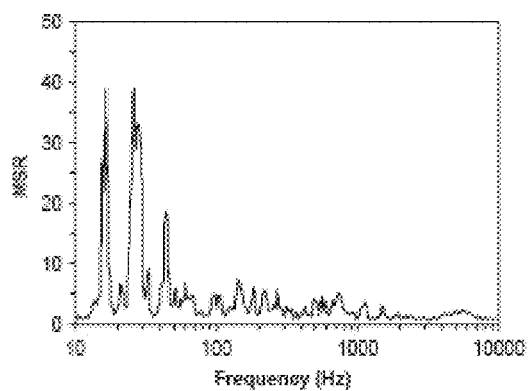
Fig. 8    Fig. 9
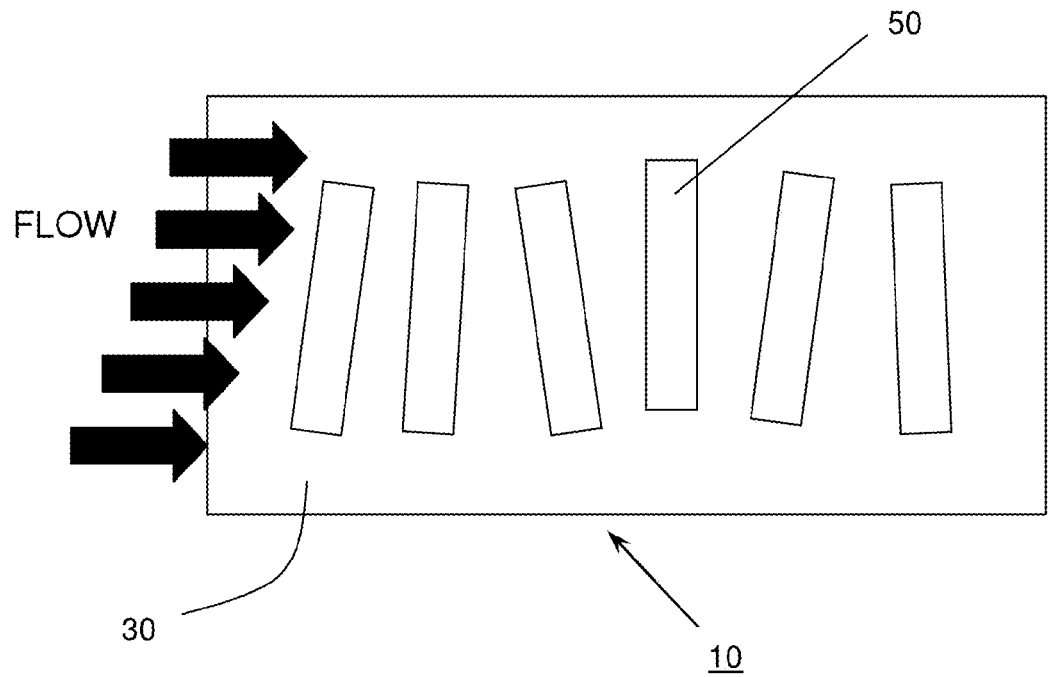
Fig. 10

FLUID FLOW NOISE MITIGATION STRUCTURE AND METHOD

CROSS REFERENCE TO RELATED APPLICATIONS

This patent application claims the benefit of provisional patent application Ser. No. 61/867,036 filed Aug. 17, 2013 by the present applicant, the disclosure of which is hereby incorporated by reference in its entirety

BACKGROUND

Flow over cavities can cause large pressure, velocity, and density fluctuations in their vicinity, as well as generate strong propagating acoustic waves. As a result, changes in surface drag, structural failure due to resonance, or the decalibration of sensitive instrumentation could occur. Cavity flows are of interest in many different areas of engineering, from thermal equipment to engines and machinery and can be found in landing-gear wells, surface mounted instrumentation on aircraft, and cutouts on marine vehicles. These are typical cavity applications where reductions in pressure fluctuation levels, heat transfer, vibration, noise, and structural fatigue are still of considerable interest.

Cavity flow fields contain a mixture of unsteady flow regimes that may include; unstable shear layers that shed vortices in coherent patterns, pressure waves, and resident vortices within the cavity oriented in the span-wise direction. Location of the shear layer and generation of self-sustaining oscillations depends upon conditions both inside and outside the cavity and in turn, affects the internal and external flow field about the cavity. This interaction is a result of an extremely complicated flow pattern that appears to depend upon the shape of the cavity (allowing it to be classified as open, closed, or transitional), Mach number, Reynolds number and the turbulence characteristics of the approaching boundary layer.

Both fluid dynamic and acoustic oscillations due to the presence of rectangular cavities have been studied over the years by many investigators. It has been suggested that this oscillation phenomenon was a result of acoustic feedback, whereby vortices that shed periodically from the upstream lip of the cavity convect downstream and impinge on the aft wall of the cavity generating an acoustic wave. These acoustic disturbances propagate upstream. Upon reaching the forward lip of the cavity, these waves can cause a shear layer to separate and result in the birth of a new vortical structure. In this way the vortex and the acoustic disturbances form a feedback loop. It has been proposed that the observed tones are a result of cavity acoustic resonance, and that the frequency of the tones corresponded to the maximum acoustic response of the cavity. It has been further postulated that the broadband fluctuation in the turbulent boundary layer was the forcing mechanism for cavity resonance.

Researchers have described a feedback mechanism based on the interaction of the separated shear layer with the boundaries of the cavity. Unfortunately, these cavities, although rectangular in shape, had different aspect ratios. Only a few studies have been performed to evaluate the frequency and amplitude content of a cavity submerged within a thick turbulent boundary layer, as its stream-wise length (L) was altered. As a result, the extent in which the cavity length influences either the frequency and/or the amplitude of these oscillations is still a subject of uncertainty. Other researchers, using a deep cavity (L/D<1) with a large aspect ratio, concluded that the observed oscillations are primarily a function of the fundamental acoustic depth mode and considered that the aerodynamically induced cavity resonance to be a result of the simultaneous tuned amplification of the shear layer unsteadiness, by both the shear layer edge tone and the cavity enclosure acting as an acoustic resonator. Evidence has been provided that tones could be generated by the cavity depth mode resonance mechanism at very low subsonic Mach numbers. It has been concluded that L/D is of possible importance and that consideration of L=θ was also important. Also noted is that narrower cavities (i.e., cavities with larger L/W ratios) generated large, sharply defined peaks within the frequency spectra, and that both wide and narrow cavities, peak at the same frequency. In addition, it has been concluded that the resonant frequency was not related to the cavity width. Since the depth remained constant and the location of the peaks did not change, it was concluded that the frequency of the resonance is most dependent on L.

In a recent aeroacoustic study, the effect of cavity L/D on flow oscillations was also examined. Reported were the following salient features: (a) Fewer cavity tones are produced by shallow cavities compared to deep cavities, (b) smaller L/Ds produced louder cavity tones, (c) cavity Strouhal number is a function of L/D, and (d) coupling between feedback resonance and duct resonance produces high intensity tones. However, their boundary layer appeared to be developing and therefore not fully turbulent.

Also, although prior investigations have been conducted in order to gain insight into the underlying physical behavior of cavity flows, differences in the state of the approaching boundary layer, cavity length and width, have made it difficult to accurately predict the observed phenomena. For the case where the cavity is set at some incident angle to the oncoming boundary layer, where the separating shear layer is no longer normal to the cavity lip, the resulting flow field is more complex. Recently there has been very little added to the present knowledge of how the cavity depth with incident angle affects the acoustic behavior of this particular flow field. The recent work of the applicant has provided an experimental study into the aerodynamic instabilities that occur within a rectangular cavity of varying depth that is immersed in a thick turbulent subsonic boundary layer and is yawed between 0° and 90° to the freestream direction.

Therefore, a goal of the of the applicant was to systematically examine the effect of L/D as well as incident angle on flow oscillations, in a rectangular cavity immersed in a fully developed turbulent boundary layer, for several different cavity lengths. To accomplish this task, an experimental program was undertaken using a single cavity model and several rectangular inserts that would be used to change the length and therefore, the L/D ratio of the cavity. The present cavity was configured with a W/D of 1 and placed within a fully turbulent subsonic boundary layer flow. This model was oriented such that its major axis was positioned parallel to the oncoming flow. Over the L/D range selected the cavity can be classified as an open cavity configuration.

The prior art contains some examples of cavity like structures that may reduce noise in a fluid flow, but none have the structural features of the present application. Shah, et al. (US 2003/0183446) has round cavities for sound attenuation. However, Shah has a common baffle chamber that all of the individual cavities fees into and the cavities do not have bottoms. Ngo (U.S. Pat. No. 6,244,817) has rectangular cavities that surround a fan, but the cavities are connected to a common cavity, have no bottoms and fluid streams out of the cavities into the fluid flow itself. Lata Perez (US 2004/0076521) shows a noise reduction conduit for aircraft engines. It discloses a multitude of cavities in an outer case surrounding a fluid flow, but the cavities have no bottoms and are connected to a common cavity. Farrell, et al. (U.S. Pat. No. 6,375,416) discloses a technique for reducing acoustic radiation in turbomachinery and teaches groves in a housing facing a fluid flow. These grooves have no ends and are not flat at the bottom. MacManus and Doran, in "Passive Control of Transonic Cavity Flow", *Journal of Fluids Engineering*, June 2008 Vol. 130, propose the altering of the leading and trailing edges of a cavity with inserts in order to affect the fluid flow. In all the above cases the cavity-like structures are static and without subdivisions within.

SUMMARY

The structure comprises at least one cavity positioned on any surface within a flow path produced in any manner. The cavity may be rectangular (or any other shape) with a width (W), length (L) and depth (D) and generally has, but may not have, a bottom. The length is generally oriented parallel to the flow direction, but other orientations are anticipated. The length may or may not be the longer side, but in the art and relevant literature, the length is the dimension deemed parallel to the flow. The cavities may be divided into sub-cavities having separate and distinct volumes, depths and shapes formed from partitions of varying heights, lengths and widths within the cavities. The cavity may be dimensioned within the ratio L/D range of 1 to 10 where fluid acoustic resonance occurs. It is envisioned that the cavity may be yawed so that the cavity is no longer parallel to the flow along the lengthwise axis. Such cavities may be passive but it is also contemplated that they may be yawed to achieve desired noise reduction or other acoustic results. The D dimension may also be changed to reduce noise levels. Each individual cavity and sub-cavity will be tuned to a specific resonant frequency to mitigate noise caused thereby. The cavity will affect the fluid flow, but will not add to or remove any mass from the flow itself. There may be oscillating (+/−) mass from the cavity, but there will be no mass added to the system as a whole. In this manner a structure comprising these cavities is static. The structure does not inject fluid into the system and does not remove any either. The structure and its cavities only affect or disrupt the fluid flowing over the cavities.

The cavities may be cast, machined, punched, cut, printed or formed by other means into the surface. The structure may be comprised of any suitable material including, but not limited to, metals, non-metals, plastics, polymers or composites. The cavities may project below through the structure of which the surface is a part if the cavity has a depth dimension greater than thickness of the material of which the structure is constructed. In other cases, where the structure is thick, the cavities may be imbedded and not project through the structure. When noise reduction is desired, such cavities may be utilized in any application where a fluid flow is encountered. The cavities are individual and separate from each other and each form a discrete pocket apart from any others. In other words, the cavities are distinct from each other. There is no common chamber to which they are all connected or other instrumentalities to which they are attached. The cavities represent a change in the geometry of the surface that modifies the local flow boundary allowing the acoustic signature of a flow field to be selectively augmented. The cavities are designed to produce a frequency that destructively interferes with specific frequencies of the fluid flow. The wave produced by the cavity is opposite to that of a flow frequency wave thereby cancelling noise produced by it. The combination of the waves produces a zero net gain or loss and, thus, a reduction of noise.

The method consists of positioning cavities, dimensioned as revealed above with an appropriate L/D ratio, within a fluid flow in order to reduce the noise of the flow. The cavities may be positioned on any surface including, but not limited to, fan housings or rotating part housings. The cavities may be positioned such that the length axis is parallel (0°) or perpendicular (90°) or at an angle to the flow. The cavities may be used on axial, centrifugal or hybrid pieces of rotating machinery, wherever there is a fixed component (fan blade housing, for example) and rotating component (fan, for example) moving relative to one another. The cavities can be applied to any fluid (liquid or gas) system. Such cavities may be applied to any surface including, but not limited to, those used in the automotive, aerospace, electronics, computer, tool, toy, heating and cooling or appliance industries. Any application where a flow is generated or moves over or past a surface could have this system designed into it and benefit from the resulting reduction in noise.

DRAWINGS

Figures

Figure 3:
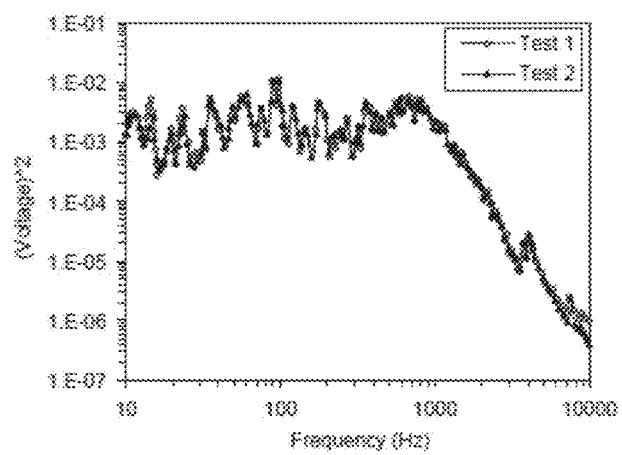

FIG. 3 displays repeatability in the frequency content of the two signals.

Figure 4:
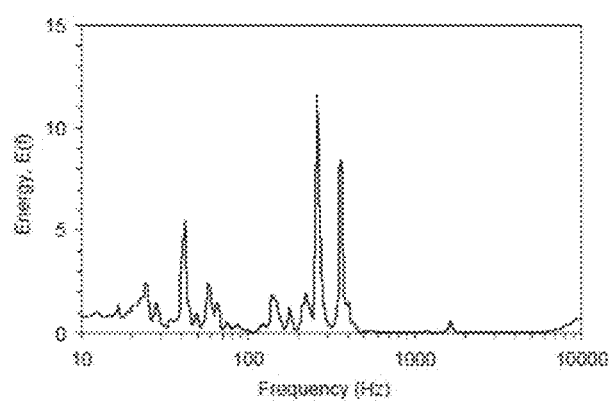

FIG. 4 represents a typical normalized boundary layer energy spectrum in the absence of a driven cavity flow.

FIGS. 5A-5F show the typical normalized spectra for each L/D cavity ratio tested.

Figure 6:
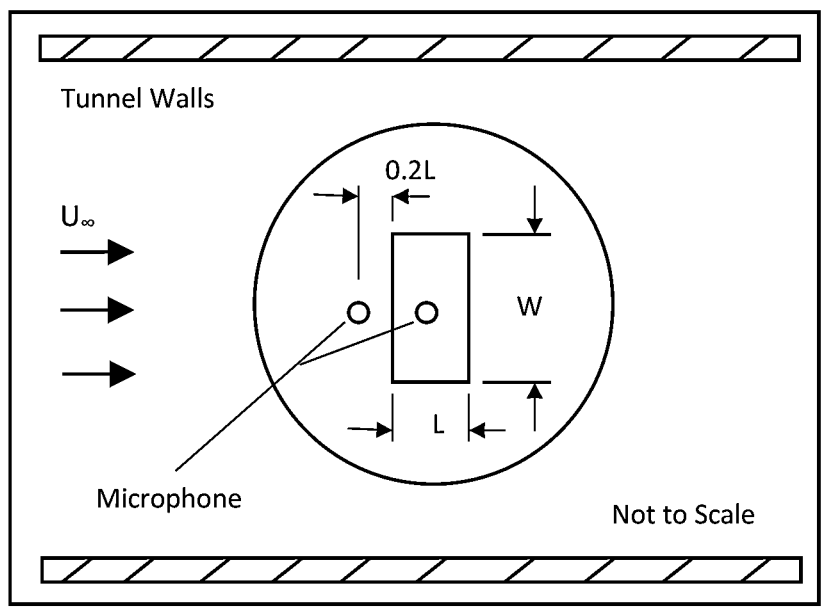

FIG. 6 represents a top view of another embodiment of an experimental three dimensional surface cavity employed to test the affects of cavity yaw on the fluid flow where the flow is parallel to the length with the length being smaller than the width dimension.

Figure 7:
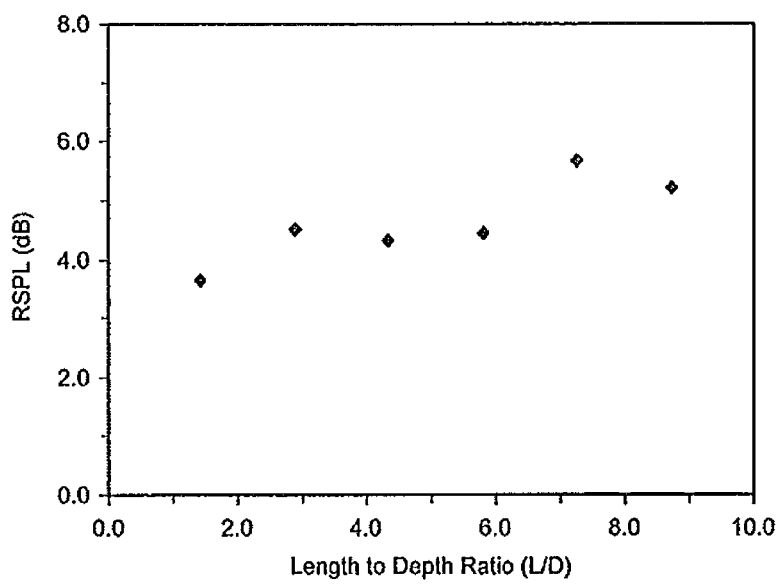

FIG. 7 represents the six changes to the surface that were made with resulting change of approximately 2 db.

FIG. 8 show the frequency content recorded by miniature omni-directional microphones used to monitor the noise level at a first location.

FIG. 9 show the frequency content recorded by miniature omni-directional microphones used to monitor the noise level at a second location.

FIG. 10 displays an embodiment of an array of rectangular cavities on a surface from above within a fluid flow that is roughly parallel to the length of the cavities with the length being the shorter dimension.

Figure 11:
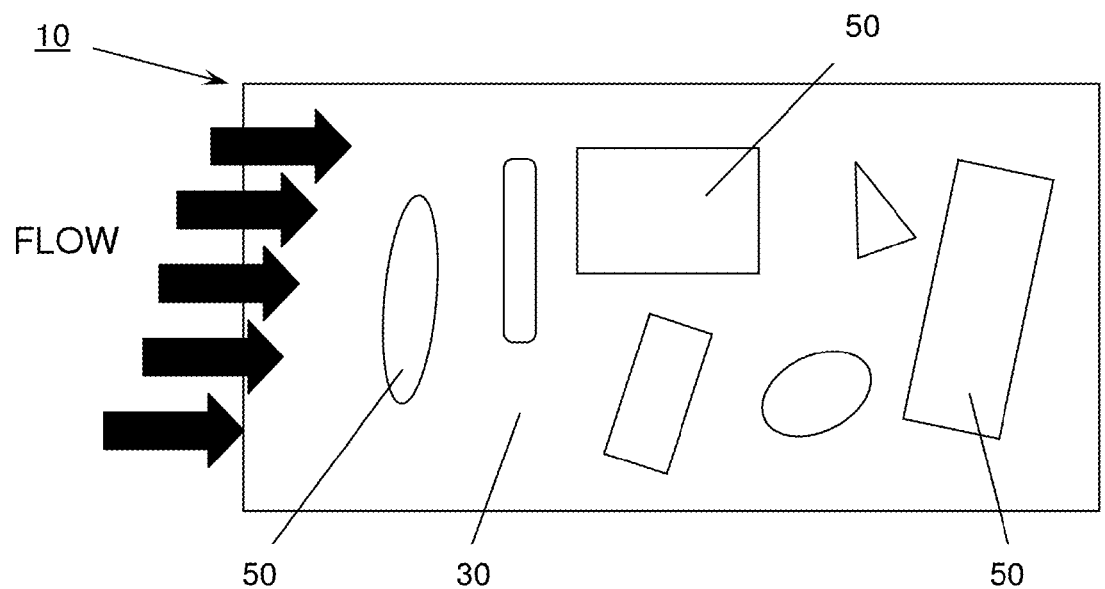

FIG. 11 displays another embodiment of an array of cavities of varying shapes on a surface from above within a fluid flow.

Figure 12:
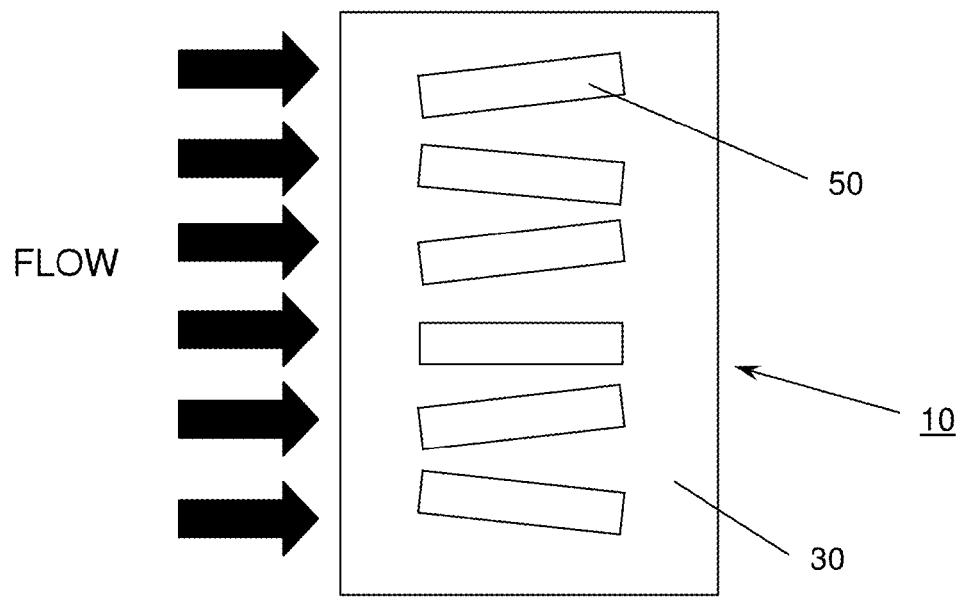

FIG. 12 displays another embodiment of an array of cavities of varying shapes on a surface from above within a fluid flow that is roughly parallel to the length of the cavities with the length being the larger dimension.

Figure 13:
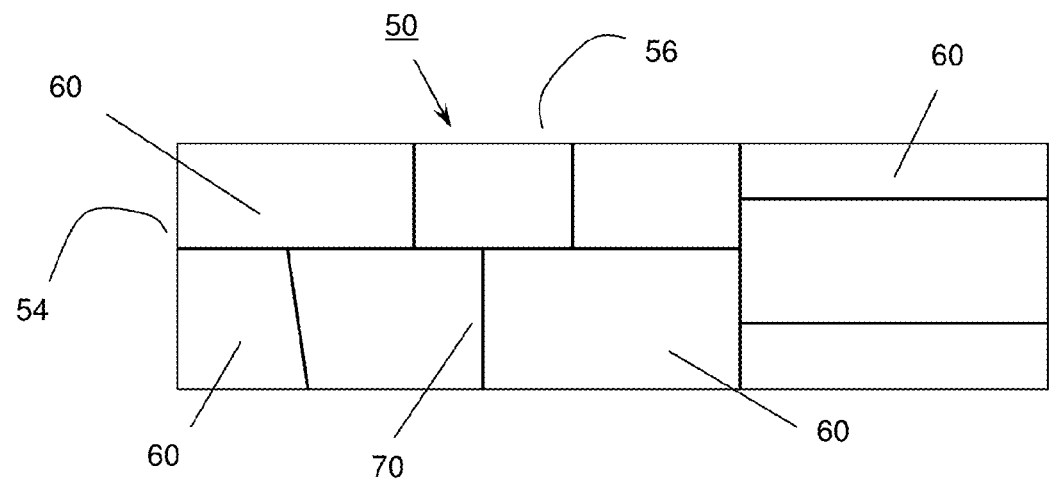

FIG. 13 illustrates the top view a cavity divided into individual sub-cavities.

Figure 14:
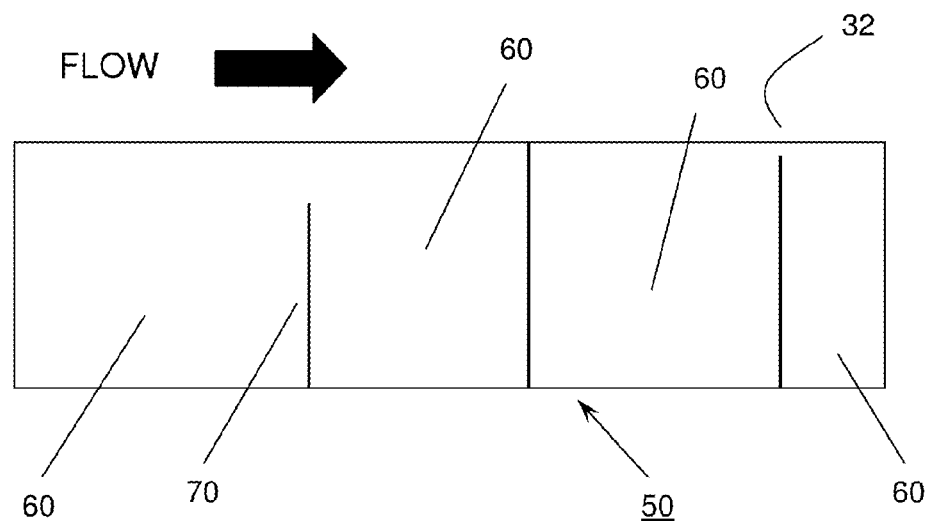

FIG. 14 illustrates a cut-away side view a cavity divided into individual sub-cavities.

REFERENCE NUMERALS

| 10 | structure | 30 | surface |
| 32 | top face | 50 | cavity |
| 52 | cavity bottom | 54 | cavity side |
| 56 | cavity end | 60 | sub-cavity |
| 70 | partition | | |

DETAILED DESCRIPTION

Cavity Model

A variable length rectangular cavity model was constructed. The dimensions of the cavity were 105 mm in width (W) and 105 mm in depth (D), see FIG. 1. Through the use of inserts, the length of the cavity (L) was allowed to take on six discrete sizes between 154 and 917 mm. This enabled the L/D ratio to be discretely set to values between 1.47 and 8.73 (Table 1). The present model was fabricated as an integral part of a turntable, which was used in a separate cavity yaw study by Disimile, et al. The turntable was then placed within the working section of a large subsonic wind tunnel. The cavity floor was positioned at 105 mm below the smooth surface of the cavity, thereby providing a W/D of 1. FIG. 2 shows the spatial relationship between the cavity transducer, upstream boundary layer transducer and the span-wise plane where detailed documentation of the approaching boundary layer was performed.

approximately 685 mm away from the working section sidewalls, was located 631 mm upstream from the cavity pivot point and location of the cavity floor transducer (FIG. 2).

To document the repeatability of the condenser microphones used in the present study, a comparison of the spectral signals obtained from the same unit 35 days apart was performed. Specifically, the cavity was rotated 90° and configured as an approximately two-dimensional rectangular cavity with an L/D of 1 and a W/L=8.73; a geometry that had previously been analyzed. The two sets of signals obtained from the cavity floor transducer were analyzed using an FFT and then compared. Very good repeatability was observed in the frequency content of the two signals, however, small differences in amplitude, typically within 10% of one another were observed (FIG. 3). This comparison gave the confidence that the day-to-day variations due to microphone shift were insignificant. In addition, an effort to determine transducer signal sensitivity to velocity drift was also undertaken. To obtain insight into the effect of velocity variation on signal repeatability, cavity floor data was acquired for three different freestream velocities. Since the wind tunnel speed could drift over the course of a 10 hour run, it was decided to select a nominal tunnel speed of 12 m/s±0.5 m/s. Cavity floor data were acquired at each of the three speeds and analyzed using an FFT. Although no significant shift in the frequency content was observed, amplitude variations of the order of 10% were apparent. This suggests that some of the variations observed in the repeatability tests maybe partly due to velocity drift.

All transducer signals were sampled and analyzed using an HP 3562A Dynamic Signal Analyzer and resolved over a frequency range from 10 Hz to 10 kHz. The accuracy of the amplitude in the frequency response measurement mode is

TABLE 1

Recorded frequency and magnitude squared ratios of the dominant peaks

| Cavity | | 1st mode | | 2nd mode | | 3rd mode | | 4th mode | |
| --- | --- | --- | --- | --- | --- | --- | --- | --- | --- |
| L/D | length (mm) | Frequency (Hz) | MSR | Frequency (Hz) | MSR | Frequency (Hz) | MSR | Frequency (Hz) | MSR |
| 1.47 | 154 | 546 | 14.4 | 27 | 11.4 | 42 | 10 | 16 | 8.2 |
| 2.92 | 307 | 15 | 20.6 | 28 | 15.7 | 43 | 9.7 | 546 | 9.4 |
| 4.37 | 459 | 16 | 36.4 | 27 | 15 | 42 | 8.1 | — | — |
| 5.83 | 612 | 16 | 41 | 27 | 16.7 | 43 | 8.3 | — | — |
| 7.28 | 764 | 16 | 37.4 | 26 | 37.3 | 43 | 17.9 | — | — |
| 8.73 | 917 | 16 | 19.6 | 28 | 18.6 | 141 | 11.5 | 42 | 9.9 |

Data Acquisition Strategy

Prior to the acquisition of unsteady pressure data, detailed hot-wire surveys of the approaching boundary layer were performed. As a check for two-dimensionality of the approaching boundary layer flow, five span-wise hot-wire traverses were performed at a location 701 mm upstream from the cavity pivot point and location of the cavity floor transducer. This location was 70 mm upstream of the boundary layer transducer. In addition to mean stream-wise velocity and turbulence intensity measurements, a separate data set was acquired at a vertical position, Z=5 mm above the boundary layer surface. A time series 20.64 s long was acquired at 16 kHz and used in the subsequent documentation of the spectral character of the boundary layer flow.

Unsteady pressures were acquired simultaneously at two locations, using surface mounted omni-directional, condenser microphone pressure transducers. One transducer unit was located on the cavity floor, equidistant from the forward and aft walls of the model. A second pressure transducer positioned on the stream-wise centerline of the tunnel, specified as ±0.2 dB. The present data was sampled over a period of 8 s at 25.6 kHz. Data examined in the present study are based on an average of 50 records, with each record consisting of 2048 samples.

The output from the signal analyzer was provided in the form of an energy spectrum, E(f). In lieu of separately reporting the E(f) of either the cavity transducer or the upstream boundary layer transducer, it was decided to directly process the unsteady pressure signals within the signal analyzer. Therefore, the effect of cavity length on flow oscillations within thru cavity model I presented as a ratio of E(f) determined from the cavity transducer signal normalized by E(f) simultaneously supplied by the upstream boundary layer transducer.

Results and Discussion

Boundary layer mean velocity and turbulent intensity profiles were acquired at several locations across the span of the working section. Span-wise traverses were obtained at the centerline (Y=0), and at ±200 mm, and ±400 mm from the centerline.

Documentation of the tunnel flow oscillations in the absence of the cavity was achieved by normalizing the boundary layer transducer signal with that of the cavity transducer in the absence of the aerodynamic influences. Specifically, the cavity transducer was energized but isolated from the freestream, thereby allowing the cavity transducer to sense only the background noise and tunnel vibrations. This was accomplished by sealing the model opening and isolating the cavity microphone transducer from the freestream. FIG. 4 represents a typical normalized boundary layer energy spectrum in the absence of a driven cavity flow.

For the six L/D ratios examined, the first four dominant peaks of each spectrum were identified, and their frequency and magnitude squared ratio (MSR) were recorded and are presented in Table 1. Typical normalized spectra for each L/D are also included in FIGS. 5A-5F, respectively.

Before the effect of cavity length could be properly assessed, the state of the approaching boundary layer, as well as existing tunnel oscillations in the absence of a cavity were evaluated. Tunnel oscillations identified in signals obtained from the upstream boundary layer transducer and an accelerometer mounted to the working section wall will be first presented. Next, the effect of cavity length, in terms of the length to depth ratio (L/D), on the frequency and spectral energy of the flow oscillations will be examined. Finally, to help determine whether the acoustic level selectively varied with L/D, the relative sound pressure level (RSPL) will also be discussed.

Boundary Layer Documentation

Boundary layer traverses were acquired, analyzed, and used to estimate the thickness of the boundary layer ($\delta$), the displacement thickness ($\delta^*$), momentum thickness ($\theta$), and the boundary layer shape factor (H). Based on the centerline traverse the $\delta$; $\delta^*$; $\theta$; H, and $Re_\theta$ were determined to be 210 mm, 18.3 mm, 13.0 mm, 1.41, and $10.5 \times 10^3$, respectively. Comparison of the hot-wire traverses acquired across the span of the tunnel enabled an assessment of the two-dimensionality of the boundary layer across the test domain. The average value of $\theta$ was determined to vary by less than 3% across the span of the cavity model examined. Inspection of dissipation spectra, indicate a region of strong dissipation between 300 and 850 Hz, with maximum dissipation occurring at approximately 680 Hz.

Working Section Flow Oscillations

Initial documentation of the flow oscillations was performed in the absence of a cavity. To eliminate the influence of the cavity, all inserts were placed within the cavity model and the surface exposed to the moving fluid was sealed. Using the boundary layer pressure transducer and accelerometer mounted to the working section wall, data were acquired. These signals were compared and resulting flow oscillations due to working section vibrations identified. Although the cavity was effectively removed, several peaks in the boundary layer frequency spectra were observed (FIG. 4). Peaks located at: 24.4, 42.2, 57.9, 141, and 224 Hz, compared well to those observed in the frequency spectra acquired from the wall mounted accelerometer and determined to be mechanical vibrations. Using the fan tachometer and the wind tunnel fan blade count, a blade passing frequency of 254 Hz was estimated. This frequency was correlated to the 258.5 Hz peak also observed in the boundary layer spectra. However, the second strongest peak located at 365 Hz, could not be correlated.

In an attempt to determine the source of this last peak, the acoustic modes of the wind tunnel working section were approximated. This was achieved by evaluating the following expression, Eq. (1), typically used for the computation of enclosure or duct acoustic modes, $$f = \frac{c}{2}\left[\left(\frac{n_x}{L_{x^*}}\right)^2 + \left(\frac{n_y}{L_{y^*}}\right)^2 + \left(\frac{n_z}{L_{z^*}}\right)^2\right]^{\frac{1}{2}}, \quad (1)$$

where $n_x$, $n_y$, and $n_z$ can independently take on integer values from 0, 1, 2, ..., $\infty$, and $L_{x^*}$, $L_{y^*}$, $L_{z^*}$ are the corresponding characteristic geometric dimensions of the working section.

The calculated modes (Table 2) were then compared to transducer data obtained when the cavity was sealed. Since frequencies greater than 630 Hz, were not of interest, Table 2 only lists the first five calculated ($n_x$, $n_y$, $n_z$) modes for $n_x=0$. Comparison of this table to the experimental results obtained for the sealed cavity show several modes within 6% of the calculated acoustic modes (FIG. 4). Specifically, inspection of the calculated modes strongly suggests that the observed peak at 365 Hz, is probably related to a working section acoustic mode.

Removing all model inserts, the cavity attained its greatest stream-wise length with a corresponding length to depth ratio, L/D of 8.73. Under the same flow conditions previously tested, two strong peaks were again observed in the normalized pressure spectra over a frequency range from 10 to 10 kHz (FIG. 5F). These peaks, stronger than those observed in the absence of the cavity, had a first mode at 16 Hz, and a second mode at 28 Hz (Table 1). Based on the spectra obtained without the cavity present and the calculated working section acoustic modes, the measured second mode was also related to tunnel oscillations caused by vibration of the working section walls. However, the first measured mode could not be correlated to either the working section oscillations or duct acoustics, and was suspected to be due to a fluid dynamic oscillation. To obtain support for this hypothesis, the shedding frequency (f) of the shear layer vortices that span the cavity mouth were estimated. Determination of an approximate vortex shedding frequency was possible using the $St_\theta$; for a separating turbulent boundary layer. Under the present boundary layer and test conditions, $f_v$ was computed to be approximately 20 Hz. This reinforced the notion that the oscillation was possibly linked to the shedding of coherent vortices from the forward wall of the cavity model.

TABLE 2

Calculated working section acoustic modes

| Acoustic mode | | Frequency (Hz) | | | |
|---|---|---|---|---|---|
| $n_x$ | $n_z$ | $n_y = 0$ | $n_y = 1$ | $n_y = 2$ | $n_y = 3$ |
| 0 | 0 | N/A | 126 | 253 | 379 |
| 0 | 1 | 110 | 168 | 276 | 395 |
| 0 | 2 | 221 | 254 | 335 | 438 |
| 0 | 3 | 331 | 354 | 416 | 503 |
| 0 | 4 | 441 | 459 | 508 | 581 |

Effect of Cavity Length on the Oscillation Frequency

As the model was fitted with inserts and the cavity length decreased (i.e., L/D reduced), the frequency of the dominant mode (referred to as the first mode) was found to remain constant at 16 Hz for all L/Ds examined, except L/D of 1.47 (FIG. 5A). At this L/D the observed peaks in the frequency spectra represented by the first and fourth measured modes switched. The dominant mode was now located at 546 Hz, while the 2nd mode remained approximately constant between 26 and 28 Hz for all configurations. Likewise, the third mode that was determined to be working section oscillations remained approximately constant at 42 Hz for all L/Ds studied except the largest. At L/D=8.73 this mode reached 141 Hz, but was still considered a working section oscillation, based on earlier working section documentation.

The L/D=1.47 configuration marked the absence of a 16 Hz peak in the m=1 mode of the normalized cavity spectra. Yet the dominant peak in the present spectra (FIG. 5A), which is well above the background noise, was nominally located at 546 Hz. This frequency coincided with an acoustic mode of the cavity, a conclusion that was arrived at after estimates were made of the cavity fundamental acoustic modes, to be discussed below.

As the cavity length was increased, this acoustic mode was observed to weaken and no longer represent the dominant mode (m=1). However, the influence of the 546 Hz oscillation, and therefore cavity acoustics is still possible between L/D=2.92 and 5.83 (FIG. 5B-5D). The presence of a 27 and 42 Hz oscillation representing the 2nd and 3rd measured modes was also observed to exist for all L/Ds studied.

In an attempt to determine the nature of these oscillations, the acoustic modes of the cavity model were computed in a way similar to the previous section. Acoustic resonance in the cavity were approximated using the modified enclosure acoustic relation, Eq. (2), $$f = \frac{c}{2}\left[\left(\frac{n_x}{L}\right)^2 + \left(\frac{n_y}{W}\right)^2\right]^{\frac{1}{2}}, \quad (2)$$

where $n_x$ and $n_y$ (which represents the longitudinal and lateral cavity modes) independently take on integer values from 0, 1, 2, ..., ∞, and, L and W represents the characteristic geometric dimensions of the cavity model. Since the pressure variation along the cavity depth is approximately constant, $n_z$ was set to zero. Using the respective model dimensions, the resonant acoustic modes of the cavity were computed for each length or associated L/D value. Calculations performed with $n_y \neq 0$ produced resonant frequencies greater than approximately 1648 Hz, which were above the frequency range of interest. Therefore, only the results for the $n_y=0$ case are listed in Table 3, for all values of cavity length (or L/D) examined.

is within 2.5% of the recorded 546 Hz peak. As the cavity length is increased to L/D=5.83 this frequency can be related to the (2, 0) mode. Likewise, at L/D=8.23 this frequency can be related to a (3, 0). Although the fundamental 546 Hz oscillation was not estimated using Eq. (2) for L/D=1.43; a second harmonic was observed in the (1, 0) mode. In addition, a calculated second harmonic between 1114 and 1122 Hz is estimated for the (3, 0) mode at L/D 4.37, (4, 0) mode at L/D 5.83, (5, 0) mode at L/D=7.28; and a (6, 0) mode at 8.73. As the cavity length increases, the importance of the acoustic mode decreases, as evident by the increasing $n_x$ mode number. The above suggests that the 16 Hz mode, assumed to be a result of fluid dynamic phenomena can, in part, be excited by the 546 Hz lengthwise acoustic mode of the cavity. Although other researchers may not have explicitly presented the same conclusions, they have suggested that it is the flow over shallow cavities that are strongly influenced by both shear layer and longitudinal oscillatory modes. Since the cavity length, in this case, was increased in multiplies of approximately 150 mm, the ability of the cavity to act as a fixed frequency acoustic excitation source continues. Thereby enabling continued excitation of a fundamental shear layer mode that may be related to the vortex shedding within the shear layer.

Spectral Energy Content of the Flow Oscillations

The energy associated with a given mode of oscillation is referred to as the spectral energy. This energy is related to and presented as the ratio of the magnitude squared of the cavity transducer signal to the boundary layer transducer signal (MSR) obtained directly from the signal analyzer. For the shortest cavity, L/D=1.47; the energy level of the 1st and 2nd modes appear to be within 20% of each other. In fact the 2nd mode was also estimated to be approximately 75% of the more dominant 1st mode at L/D=2.92 and approximately 40% of the dominate mode at 4.37 and 5.83. As L/D was further increased, the 2nd mode rapidly approached the 1st mode to within 5%.

The MSR of the m=1 mode reached its maximum value of 41 at L/D=5.83. Furthermore, the MSR of this mode was observed to only vary between 36.4 and 41 for L/Ds from 4.37 to 7.28, but dropped by one-half at L/D=2.92 and 8.23. However, the m=2 mode stayed below 19 in all cases examined, except the L/D=7.28 configuration where the MSR increased

TABLE 3

Calculated cavity acoustic modes

| Acoustic mode | | Frequency of acoustic oscillation L/D (Length of Cavity, mm) | | | | | |
|---|---|---|---|---|---|---|---|
| $n_x$ | $n_y$ | 1.43 (154) | 2.92 (307) | 4.37 (459) | 5.83 (612) | 7.28 (764) | 8.73 (917) |
| 1 | 0 | 1114 | 559 | 374 | 280 | 224 | 187 |
| 2 | 0 | 2227 | 1117 | 747 | 560 | 449 | 374 |
| 3 | 0 | 3341 | 1676 | 1121 | 841 | 673 | 561 |
| 4 | 0 | 4455 | 2235 | 1495 | 1121 | 898 | 748 |
| 5 | 0 | 5568 | 2793 | 1868 | 1401 | 1122 | 935 |
| 6 | 0 | 6682 | 3352 | 2242 | 1681 | 1347 | 1122 |

The 546 Hz peak in the frequency spectra is clearly identifiable for normalized lengths less than L/D=7.28; with a value approximately two times greater than the background level (FIG. 5e). Although L/DS equal to and greater than 7.28 support the presence of a 546 Hz peak, its amplitude is very small. An inspection of the calculated acoustic modes for the cavity model clearly indicates a nominal 560 Hz peak at L/D=2.92; 5.83, and 8.73 (Table 3). Specifically, at L/D=2.92 this peak is represented by the $n_x$; $n_y$=(1, 0) acoustic mode and to 37.3, within 0.3% of the m=1. In general the 3rd mode, which was determined to be a working section oscillation, remained approximately constant for all L/Ds except 7.28. In this configuration the 3rd mode was observed to increase by a factor of two, to a level of 17.9. As L/D was further increased to 8.73, the maximum L/D examined in the present study, the MSR of the 3rd mode dropped and returned to within 25% of its previous level. For the L/Ds studied, a 4th mode, which represented weak cavity acoustic modes or test section oscillations, remained within 22% of the 3rd mode, except between L/D of 4.37 to 7.28. In this L/D interval the 4th mode was indistinguishable from the background noise. This redistribution of energy can be observed where the spectral band strength is plotted against L/D. It is clearly observed that a loss of acoustic energy (indicated below MSR levels at 141 and 546 HZ) occurs between L/D 4.37 and 7.28. However, this energy loss does not appear to compare to the relatively large energy increase observed in the 15 and 26 Hz bands.

The origin of this energy increase must now be addressed. Did this spectral energy come from the mean flow or was it transferred from other modes, resulting in no net gain in total energy? The applicant suggests that this increase in energy may be a result of the growth and saturation of the organized, large scale vortical structures that make up the free shear layer which spans the cavity opening. Support for this hypothesis may be found by determining the distance (Xs) from the boundary layer separation point to the location where the coherent vortical structures have their greatest energy. At this location of maximum energy, a vortical structure is said to be saturated. An estimate of $X_S$ can be obtained by defining a saturation Strouhal number ($St_s$) and setting it to unity. However, previous studies on voracity dynamics of excited and natural free shear layers have shown that the $St_s$ can vary between 0.93 and 0.98. After estimating the virtual origin of the shear layer to be approximately 23 mm and using an average $St_s$=0.955; an $X_S$ of 703 mm was computed. Normalizing this distance, one obtains $X_S/D \approx 6.7$. Since this is the location where the shear layer vortices attain their greatest energy, vortex impingement should produce the greatest transfer of energy to the impinging surface. This suggests that the strongest feedback would occur when the downstream or aft wall of the cavity is placed at the location where the impinging shear layer vortices attained their greatest energy. That is, a cavity configured with an L/D=6.7 would nominally produce the greatest upstream traveling pressure wave and result in the strongest cavity oscillation.

Cavities shorter than L/D=6.7 would experience developing vortical structures with less than maximum energy. Likewise longer cavities with L/D greater than 6.7 would also experience less energy. This is a result of the vortical structures entering their decay phase, where the destruction of a coherent structure, due to fluid dynamic instabilities occurs.

Extrapolating the trend, for the m=1 curve, between L/D 4.37 and 5.83 forward, and likewise backward from 8.23 to 7.28, the intersection of these two lines indicate a maximum at approximately L/D=6.8. This suggests that the maximum in the 1st mode may not have been resolved in the current study. However, this location is in excellent agreement with that location computed using the concept of coherent structure saturation. As one may expect, beyond this value the amplitude drops off. It has been reported that as the L/D increased, the cavity changed from resonant to non-resonant. Further, this peak amplitude was observed to decrease beyond some critical L/D value. In order to gain additional insight into this process, the total energy was estimated. In the present study this was accomplished by calculating a RSPL. In the next section the RSPL will be examined for each cavity length.

Variations in the RSPL with Cavity Length

Typically, time histories of the surface pressures are used to calculate sound pressure levels (SPL) within the cavity using the following Eq. (3):

$$\overline{SPL} = 10 \log_{10} \left[ \frac{\sqrt{\overline{(p'^2)}_{cavity}}}{20 \times 10^{-6}} \right], \quad (3)$$

where $20 \times 10^{-6}$ Pa is a standard reference value used in acoustics and, p' represents the component of fluctuating pressure given by Eq. (4), $$\overline{p'^2} = \frac{1}{F} \int_{f_1}^{f_2} (p - \overline{p})^2 \, df, \quad (4)$$

where F is defined as the frequency interval $f_2 - f_1$. However, to determine the effect of L/D on changes in the cavity environment related to the upstream boundary layer, a relative sound pressure level, RSPL; was computed as follows:

$$\overline{RSPL} = 10 \log_{10} \left( \frac{\overline{(p'^2)}_{cac}}{\overline{(p'^2)}_{Bl}} \right). \quad (5)$$

Therefore, the values calculated using eq. (5) provide direct information on the relative change in the sound pressure level resulting from the addition of the cavity, as well as changes due to modifications of the cavity geometry. Using a sound level meter, a baseline sound level (dB) in the absence of the cavity was recorded. Under the present test conditions this value was determined to be approximately 75.5 dB.

Calculation of the RSPL would enable a direct comparison of the total energy for each L/D and make it possible to determine whether the energy was merely redistributed or if the total energy contained within the cavity, as represented by the RSPL (FIG. 8) changed. Although a particular mode may have been enhanced, inspection of FIG. 8 clearly shows that the RSPL ranges between 3.7 and 5.7 dB, varying by 2 dB. Although this change in dB level appears to be small, it must be remembered that dB is logarithmic and therefore, such dB variations can be equated to an energy increase of approximately 60%. The maximum RSPL recorded in the present study corresponded to a cavity length of 764 mm (L/D=7.28). Since the amplitude of the dominant acoustic modes, at the smallest L/D (=1.47) was observed to drop to the background level as L/D increased, RSPL maximum suggests that cavity unsteadiness is a result of a different mechanism. Although acoustic influences, resulting from standing waves within the cavity or pressure waves reflecting off the cavities aft wall maybe present, the driving mechanism appears to be related to vortex shedding.

In general, the magnitude of the RSPL obtained while the present cavity was driven by an acoustic mechanism is considerably less than that due to the fluid dynamic oscillation. The fact that the maximum MSR value of the m=1 mode does not coincide with the maximum RSPL is believed to be related to the limited number of model inserts, that is, more L/DS were needed between 5.83 and 7.28. If additional inserts were available, it is expected that the greatest oscillations would occur at the previously determined L/D of approximately 6.7. From the above information it is apparent that although some energy may have been transferred from one mode to another, the m=1 maximum apparent in the MSR plot, is a result of an increase in total energy. Based on vortex dynamics it is further suggested that vortex shedding coupled to the acoustic and pressure modes of the cavity is the driving mechanism of the flow oscillations in the cavity. Matching the cavity length to the Xs of the coherent structures ensures that vortices impinging on the cavities aft wall would possess and transfer the greatest amount of coherent energy to the wall.

A ratio of flow unsteadiness within the cavity to that recorded in the upstream boundary layer was examined as the cavity length was varied. Using a rectangular cavity with a fixed depth and planform aspect ratio (W/D) of unity, the cavity length was varied. Specifically, L/D was varied between 1.47 and 8.73 during which time the magnitude and frequency of cavity unsteadiness were recorded. The present results suggest that the cavity undergoes mode switching from a state of acoustic resonance to a fluid-acoustic state as L is increased. The state of acoustic resonance was only observed for the smallest configuration, L/D=1.47. However, Research & Indu. Appls. (INJERIA) ISSN 0974-1518, VOl. 5, No. II (May 2012), pp 27-50, the contents of which is incorporated by reference in its entirety herein.

The model was fitted into a 279.4 mm diameter turntable such that it could be rotated between 0° and 90° in increments of 5°, and positioned symmetrically across the tunnel with the major axis (width) perpendicular to the flow direction (Table 4). Although twelve omni-directional microphones of 6 mm diameter were located inside the cavity and two located on the turntable for use in recording pressure oscillations, only two microphones were utilized in this study. One located flush with the floor of the cavity, and one located 0.2 L upstream of the cavity lip in the surface of the turntable.

TABLE 4

| Yaw Angle Degree | First Mode | | Second Mode | | Third Mode | |
|---|---|---|---|---|---|---|
| | Frequency Hz | Magnitude Squared | Frequency Hz | Magnitude Squared | Frequency Hz | Magnitude Squared |
| 0 | 784.35 | 3.1 | 3420.6 | 2.23 | 136.6 | 1.67 |
| 5 | 786.13 | 3.2 | 3420.4 | 2.35 | 141.6 | 2 |
| 10 | 788.57 | 3.45 | 3420.05 | 2.37 | 136.72 | 1.41 |
| 15 | 783.69 | 2.92 | 3420.05 | 2.33 | 146.48 | 1.43 |
| 20 | 773.93 | 4.29 | 3354.5 | 2.69 | 146.48 | 1.49 |
| 25 | 798.34 | 3.37 | 3435.06 | 1.82 | 131.84 | 1.41 |
| 30 | 771.48 | 3.38 | 3376.46 | 1.88 | 156.25 | 1.34 |
| 35 | 798.34 | 2.95 | 3366.7 | 2.5 | 131.84 | 1.3 |
| 40 | 782.56 | 3.25 | 2252.16 | 2.42 | 123.7 | 1.3 |
| 45 | 771.48 | 3.31 | 3356.93 | 2.65 | 122.3 | 1.31 |
| 50 | 769.04 | 3.67 | 3376.46 | 1.92 | 126.95 | 1.67 | as L/D was increased between 1.47 and 8.73, a switch to a fluid acoustic resonance was observed. Under these conditions energy within selected cavity modes were observed to increase by approximately 60% between L/D=2.92 and 7.28. Due to the limited number of model lengths examined, the maximum RSPL was determined to be located at L/D=7.28. It is also suggested that the observed increase in the total energy is a result of vortex shedding, growth, and saturation. If additional L/Ds were examined between 5.83 and 7.28 further increases in the RSPL would be expected, with a maximum occurring at L/D of approximately 6.7, which is the location of vortical structure saturation. This research sheds new light on flow unsteadiness due to the presence of a rectangular cavity and provides preliminary guidance on the critical cavity length required to produce maximum flow unsteadiness. The above cavity model and noise reduction theory is based upon "Acoustical properties of a long rectangular cavity of constant cross-section immersed in a thick boundary layer" by Disimile and Toy in *International Journal of Mechanical Sciences* 46 (2004) 1827-1844 the contents of which is incorporated by reference in its entirety herein.

Yaw Experimental Setup

A small rectangular cavity model was constructed having internal dimensions of 53 mm in length (L) as measured along its minor axis (oriented in the stream-wise X direction), and 106 mm in width (W) as measured in the span-wise (Y) direction, yielding a planform aspect ratio (W/L) of 2.0. The depth (D) of the cavity was variable and ranged from 0 mm (i.e., flush with the tunnel wall) to approximately 2.35 L or 124.6 mm (FIG. 6). Five different cavity depths were made available allowing five different length to depth ratios to be studied. The following cavity model and noise reduction theory is based upon "Pressure Oscillations Within a Yawed Rectangular Cavity in Subsonic Flow" by Peter J. Disimile, Xinwen Bai and Norman Toy in *International J. of Engg.*

Effect of Yaw on the Frequency of the Oscillations

To determine the effect of cavity yaw, the first three dominant peaks were identified for the particular cavity of L/D=0.769 and W/L=2 at a wind tunnel speed of 14.48 m/s. The frequencies and the Magnitude Squared Ratio (MSR) are recorded in Table 4.

To determine how the Yaw angle affects the cavity tones, the Strouhal number $St_L(\psi)$ based on Yaw angle was computed from $$St_L(\psi) = \frac{f^* L(\psi)}{c} \quad (6)$$

Where f is the frequency of the peak, L ($\psi$) is the effective length in the stream-wise direction and c is the speed of sound. Strouhal numbers of the first three modes change with different Yaw angle where it may be observed that the Strouhal number varies between 0.525 and 1.066, and peaks to a value of 1.2 at a Yaw angle of 25°. This is in contrast to the Strouhal number of the peak of the cavity depth acoustic mode which was found to be between 0.118 and 0.245, and the Strouhal number of the fluid dynamic mode which was found to be between 0.021 and 0.0423.

Effect of Yaw on the Magnitude of the Pressure Oscillations

To determine the effect of Yaw on the magnitude of the pressure oscillations the mid-size cavity of L/D=0.769 and a width to length ratio of W/L=2 was utilized. The magnitude of the normalized pressure fluctuations was determined for all angles between 0° and 90° at a wind tunnel speed=14.48 m/s, with the first three modes plotted against yaw angle.

The magnitudes of the normalized cavity pressure oscillations represented by the first three dominant modes for all Yaw angles ($\psi$) are between 1.2 and 4.59 times those recorded by the boundary-layer transducer. Furthermore, at Yaw angles of 20° and 60°, the normalized magnitudes of the pressure oscillations of the first mode grew and created peaks. At ψ=20 degrees, the largest magnitude is 4.29 at a frequency of 773.93 Hz, whereas at ψ=60 degrees, the largest magnitude is 4.59, at a frequency of 771.48 Hz, with the cavity dominated by a depth acoustic mode.

Effect of Yaw on the Relative Sound Pressure Level (RSPL) Oscillations

To determine whether a particular mode was amplified at the expense of another or whether the total energy contained within the cavity as represented by the RSPL (equation 6) increased as the cavity is Yawed, the same cavity was used with a L/D=0.769 and a W/L=2 for Yaw angles between 0° and 90°.

Although a particular mode may have been enhanced, the RSPL drops by approximately 0.52 dB up to ψ=15 degrees. Beyond this angle, between 20° and 35°, the RSPL remains approximately constant at 33.39 dB, and this suggests that the flow field itself remains largely invariant. Beyond a yaw angle of 35° however, a strong increase in flow unsteadiness is observed reaching a maximum of 34.31 dB at 55°. This is followed by steeply decreasing energy levels with increasing Yaw angle up to 65°. The drop in this energy value is 1.79 dB and this can be equated to an energy decrease of approximately 1.51 times. In particular, the yaw angle range from 35° to 65° clearly marks the existence of a strongly resonating cavity. A much smaller decrease in energy of 0.69 dB is again prevalent between 75° and 85°.

Although these results have clearly demonstrated the highly organized nature of the flow in the Yaw angle range from 35° to 65°, it was also considered necessary to estimate whether the freestream velocity had any effect on the performance of the cavity. The results indicate that changes to the magnitude of the flow instabilities occur throughout this range of velocities although the similarities are very close.

The significance of a critical angle of Yaw (ψ) has been reported in previous studies without determining the source of the effect. For example, previously a cavity was used with a planform ratio of 2 in a subsonic flow and showed that the largest mean drag force was experienced by the cavity when set at approximately ψ=60°. At supersonic speeds, Disimile indicated that a local SPL maximum, 3 dB above background level, occurred at approximately 57.5° of yaw. Furthermore, the earlier subsonic studies of triangular cavities found cavities with an equivalent ψ=60° apex angle, between the oncoming flow and the leading edge, were observed to undergo a state of resonance.

Results of the present testing, supported by previous research, suggest that when the cavity was rotated, fluid is entrained into cavity from the separating shear layer and produces high pressures on the downstream wall. Some of the entrained fluid recirculates towards the upstream corner of the cavity producing a low-pressure region. This inward and upstream flow is likely to interact with the separating shear layer in an oscillatory manner. When the cavity is set at approximately 55° to the freestream flow, a strong vortex in the downstream corner is established with the flow becoming increasingly aligned with the long cavity axis producing stagnation pressures on the downstream end wall of the cavity.

Experimental investigations have been conducted by the applicant into the aerodynamic instabilities that occur within a rectangular cavity of varying depth that is immersed in a thick turbulent subsonic boundary layer and yawed to the freestream direction. The experimental cavity model has a planform aspect ratio W/L of 2.0 and the depth aspect ratio (L/D) for five cavities was varied from 0.476 to 2. The yaw angle of the cavity was rotated from 0° to 90°. Omni-directional microphones in both the boundary layer and within the cavity recorded the magnitude and frequency of the cavity pressure oscillations. From an analysis of the ratio of the unsteady pressures within the cavity to those of the upstream boundary layer it was found that three frequency ranges occur: a) a low frequency range, where the peak occur around 141.41 Hz and is fluid dynamic driven; b) a middle frequency range, between 627~1240 Hz, and frequency of peak increases as L/D increases, and is driven by the cavity depth acoustic mode; c) a high frequency range of around 3400 Hz, and is driven by the cavity acoustic mode. Furthermore, when L/D increases from 0.476 to 2, the value of RSPL within the cavity decreases from 33.6 to 32.74, and is equated to an energy loss of approximately 22 percent.

A state of fluid acoustic resonance was also observed to occur at a Yaw angle of ψ=60°, which may in part be related to the orientation of the cavity leading edge, i.e., the cavity forward wall, with a maximum in the sound fluctuation level being observed at ψ=55°. Furthermore, the drop in the energy value between ψ=55° and 65° is 1.79 dB and this can be equated to an energy decrease of approximately 1.51 times. Research by the applicant has clearly shown that both yaw angle and the cavity depth are the main parameters influencing both the mean and unsteady pressure field.

It has been shown during the above described research that the acoustic signature of a flow field can be significantly altered through fluid structure interactions caused by the local surface geometry. That is, by geometrically modifying the local flow boundary, the acoustic signature of a flow field can be selectively augmented without changing the mean static pressure across the modified surface. This is made possible by properly rearranging the local vorticity distribution present in the flow. In this patent application the vortices produced by fan blades, for example, interact with each other and the surrounding flow to produce an oscillating pressure field and noise. The proposed fluid structure interaction is designed to cause interference between the normally produced vortical field and that induced by the proposed surface modification, resulting in a significant noise reduction.

To the applicant's knowledge the proposed approach has never been applied to a rotating blade or fan for the purpose of noise reduction. However, much work has been done on the unsteady pressure fields due to the effect of flow field modifications generated by geometrical protuberances. Specifically, it is envisioned that the proposed geometric changes to the surface of the fan housing will result in numerous fluid structure interactions. These interactions will cause the local vortical structures to interfere and result in significant vorticity redistribution and lead to reductions in noise level, without adversely affecting the fan flow rate. When these fans are operating at a fixed flow rate, the system will be configured as passive, however, if the fan speed varies, an active geometric adjustment methodology can also be added.

The applicant has previously shown the ability to change sound pressure levels in low speed incompressible flows by 2 and 3 db. As an example the following data is presented from the past studies in which sound pressure level reduction was achieved in a constant low speed air flow for two different surface modifications, as compared to an unmodified case. In one geometric arrangement a 1 db change in noise level was recorded. In a second separate configuration (change relative to the reference case) a reduction of approximately 2 db was recorded. These results were not in any way optimized and are displayed for illustrative purposes in the following figure. The ordinate (y-axis) represents the relative sound pressure level (RSPL) recorded for several different surface modifications or arrangements (x-axis). In this study a total of six changes to the surface were made, resulting in a change of approximately 2 db. Combining the two arrangements a minimum of 3 db was observed (FIG. 7).

The frequency range over which these changes have been observed is between zero and 10 kHz. FIG. 8 and FIG. 9 show the frequency content recorded by miniature omni-directional microphones used to monitor the noise level, for two different geometric arrangements.

The data is presented as the magnitude of the sound compared to a reference (MSR) plotted against frequency. Integrating these curves one can see that the overall sound pressure level (SPL) is lower for the geometric arrangement 1 (where L/D=1.47), represented by the left hand curve, compared to the results of the second configuration displayed on the right (L/D=7.28). Also important to note is a significant reduction in the low frequency components of the SPL showing that both the overall average SPL as well as the local (or spectral distribution) can be significantly influenced using the proposed approach.

The inventive system comprises at least one cavity positioned on the surface of a fan housing or any other surface within the fluid flow path produced by any means including a fan or rotating blade located within the fan housing as taught in the attached description. The cavity may be rectangular (or any other shape) in shape with a width, length and depth and may have a bottom. The length dimension is generally oriented parallel to the flow direction. The cavity may be dimensioned within the ratio L/D range of 1 to 10 where fluid acoustic resonance occurs as described above. It is envisioned that the cavity may be yawed so that the cavity is no longer parallel to the flow along the lengthwise axis as is likewise described above. Such cavities may be passive but it is also contemplated that the orientation or shape may be changed to achieve desired noise reduction or other acoustic results. The cavities may be active in that they may be mechanically rotated or changed dimensionally. Dimensional changes may be accomplished utilizing removable inserts or shims placed within the cavity to change the volume or shape. Rotation of the cavities may be accomplished using methodologies know by those skilled within the art employing linkages, turntables and other rotation mechanisms currently used to control the angle of vanes in jet aircraft engines, for example.

The cavities may be cast, machined, punched, cut, printed or formed by other means into the inner surface of the surface (i.e. shroud). When noise reduction is desired, such cavities may be utilized in any application where a fluid flow exists (or a fan or rotating blade is employed with a surrounding shroud). The cavities may be individual and separate from each other and each form a discrete pocket apart from any others. In other words, the cavities are distinct from each other. There is no chamber to which they are all connected or other instrumentalities to which they are attached. The cavities represent a change in the geometry of the surface that modifies the local flow boundary allowing the acoustic signature of a flow field to be selectively augmented.

The inventive method consists of positioning cavities, dimensioned as revealed above with an appropriate L/D ratio, within a flow in order to reduce the noise of a fan, other rotating objects or a flow in general. The cavities and system use destructive interference to cancel noise. The frequency of the noise is cancelled by an opposite wave set up by the proper tuning of the cavities. The cavities would be positioned on the surface of the fan blade housing, rotating part housing or surface over which a fluid flows. The cavities may be positioned such that the length axis is perpendicular, parallel or at an angle to the flow depending on the noise frequency to be reduced. The cavities may be used on axial, centrifugal or hybrid pieces of rotating machinery, wherever there is a fixed component (fan housing, for example) and rotating component (fan, for example) moving relative to one another. Such cavities may be applied to any fan and fan housing including, but not limited to, those used in the automotive, aerospace, electronics, computer, tool, toy, heating and cooling or appliance industries. Any application in which rotating components create a flow over, or through, a housing could have this inventive system designed into it and benefit from the resulting reduction in noise. It also contemplated that any fluid flow with such a cavity or arrays of cavities will have its noise mitigated thereby if the cavities are designed and arranged properly to specific frequencies of the flow.

In another embodiment it is envisioned that the cavities will be arranged in a series or an array on a surface within a fluid flow. The cavities will be individual and distinct and each be oriented by specific angle in reference to the fluid flow. It is anticipated that the cavities will be generally separated from each other by a portion of the face of the surface that at is in contact with the fluid flow. In other words, there will be an area of the surface face between the cavities. However, a structure made entirely of cavities of varying dimensions placed within a fluid flow is contemplated as well. The cavities may be of different width, depth, length and geometric shape (i.e. rectangular, square, circular, oval). The cavities may be arranged in any pattern on the surface (i.e. in rows across the flow, in rows with the flow, scattered, symmetrically, scattered). The shapes, angle of yaw, L/D ratio, arrangements and numbers will be determined experimentally to reduce the noise of specific frequencies of the flow (FIGS. 10-12).

A further embodiment contemplates the cavities being divided into sub-cavities. Partitions or dividers may be positioned within the cavities to define separate and individual sub-cavities (FIGS. 13-14). The sub-cavities may be of identical or differing height, width, depth, orientation or geometric shape as may the partitions used to define them. Like the cavities themselves, the arrangement, orientation, volume and shape will be dictated by the specific frequency of the flow that the sub-cavity is intended to mitigate. The partitions may be removable and changeable to actively alter the volume, shape and orientation of the sub-cavities.

Figure 1:
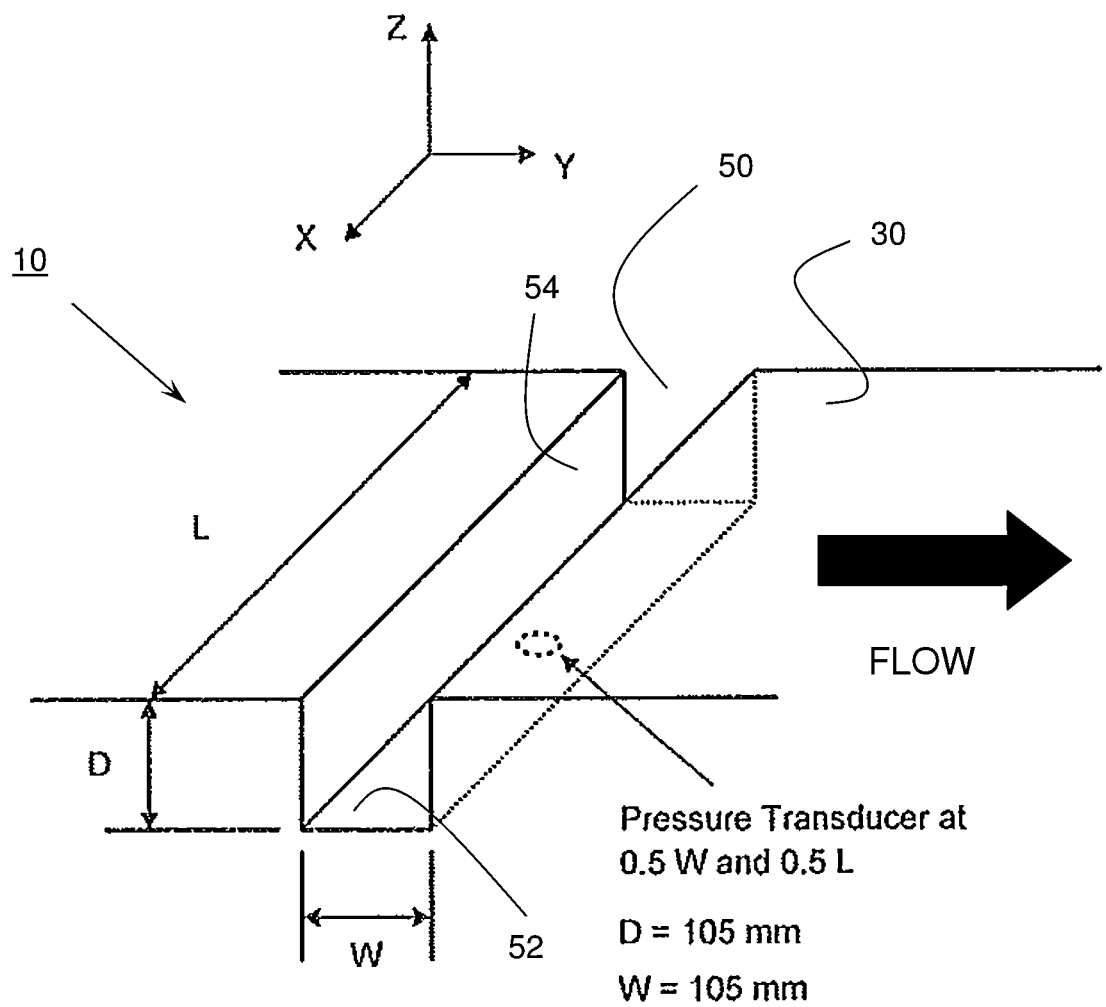
FIG. 1 shows a representation of a cavity with a length, width and depth as well as a two dimensional position for a pressure transducer with the flow perpendicular (90°) to the length of the cavity where the length is larger than the width. Cavity end walls are not depicted in the figure, but would be present.
Figure 2:
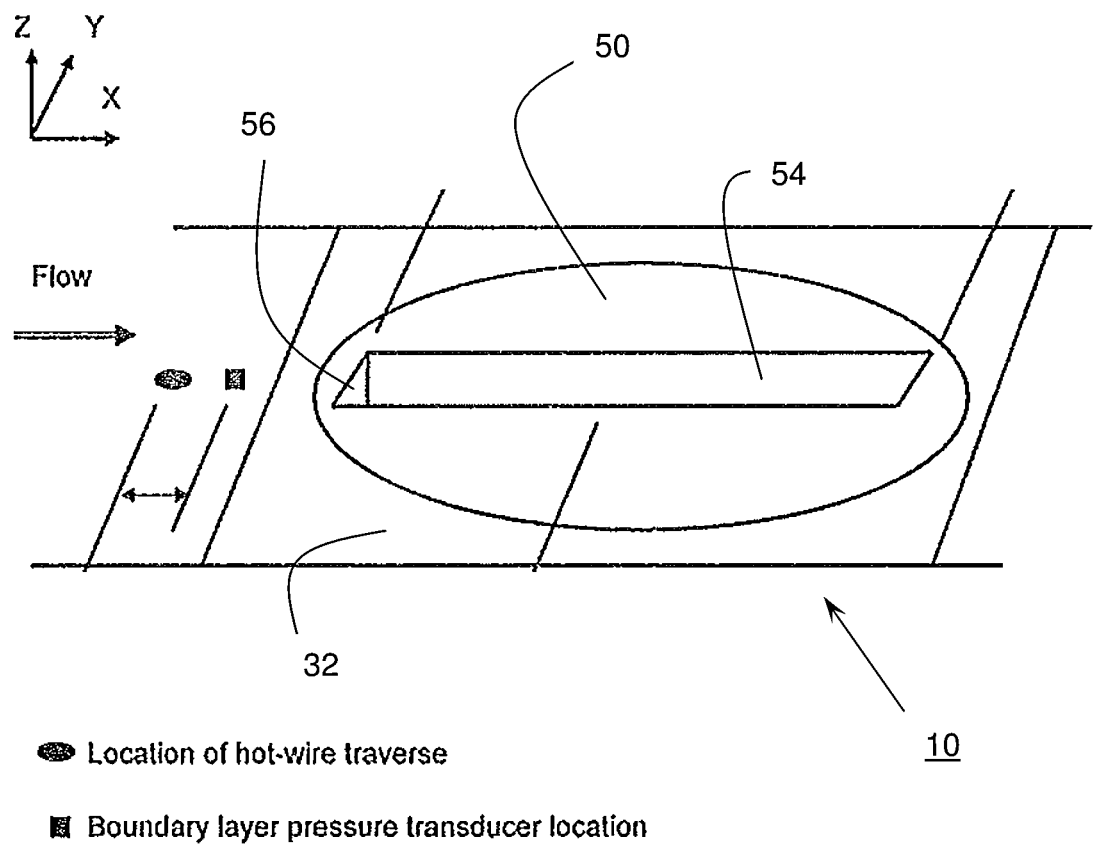
FIG. 2 shows a representation of a cavity with a length, width and depth placed within a three dimensional surface as well as flow direction parallel (0°) to the length of the cavity where the length is larger than the width.

FIGS. 1-2 disclose a structure 10 over which a fluid flow passes. It is contemplated that structure 10 may be any surface over which a flow might pass, including but not limited to flat surfaces, airfoils, fan housings, cowlings, aircraft surfaces, automotive surfaces and naval applications. The structure 10 will have a surface 30 that is positioned below the fluid flow. The surface 30 of the structure 10 will have a top face 32 in contact with the fluid flow. FIG. 1 shows the length, width and depth axes of the cavity. Here the length is longer than the width and the flow is perpendicular to the length. The structure will also have multiple cavities 50 set into the surface 30 open to the fluid flow at the top surface 32. FIG. 2 shows a rectangular cavity 50 having a bottom 52, sides 54 (which represent the length dimension), and ends 56 (which represent the width dimension). In FIG. 2 the flow is parallel to the longer length axis. In other embodiments the cavities may be other shapes including squares, circles and ovals also having a depth and an axis of length and an axis of width (FIG. 11). The bottom 52 may be flat or it may stepped, ridged or otherwise textured or shaped.

The L/D (Length/Depth) ratio, as mentioned above, may be used to determine the most effective dimensions for the cavity 50 to reduce the noise of specific frequencies. In the case of a rectangular or square cavity 50, L is the length of a side 54 while D is merely the depth of the cavity 50. Non-rectangular shaped cavities will have a depth and a relative length based upon the axes of the cavity depending on the geometry of the particular shape. The L/D ratio can thus be determined for these other shaped cavities 50 to attain optimum noise reduction.

The cavities 50 will be separate and distinct from each other. The cavities 50 may be individually sized and positioned, but will be open on the face or side facing or in direct contact with the fluid flow. The cavities 50 will positioned in an array or a series in a manner so that the fluid flow will pass over them (FIGS. 10-12). The cavities 50 may be arrayed symmetrically in rows or patterns or may be unsymmetrical in arrangement. An array may contain different shapes and sizes of cavities 50 to meet specific requirements. The cavities 50 may also be the same size and shape if required. In FIG. 10 displays how the cavities 50 may be yawed or angled in relation to direction of the fluid flow. Each cavity may be yawed at a specific angle to mitigate the noise associated with a specific frequency of the flow. The cavities 50 may be yawed at the same angle if desired as well. In FIG. 10, the flow direction is basically parallel (0°) to the shorter length dimension of the cavities 50 with the yaw being slightly off of parallel. In FIG. 12, the flow direction is also parallel (0°) to the length direction of the cavities 50 with the yaw being off of the parallel position, but in this case the length dimension is larger than the width. Both arrangements, as well as others, are anticipated by the applicant. It is also anticipated that in another embodiment the yaw of the cavities 50 may be adjustable and not a permanent configuration through the use of removable cavities or mechanically rotatable cavity fixtures thereby providing an active control. In further embodiments the yaw may be fixed.

It has been found by the applicant that noise is appreciatively reduced when the cavities 50 are sub-divided and the fluid flows over these sub-divisions. FIGS. 13-14 disclose examples of cavities divided into sub-cavities 60. Such sub-cavities 60 also act to reduce noise levels and can be individually tuned to certain frequencies. The sub-cavities 60 are open to the fluid flow and may be of different sizes, shapes and configurations. Partitions 70 physically divide the cavity 50 into the sub cavities 60. The partitions 70 may be of different heights and define sub-cavities of differing heights (FIG. 14). The partitions 70 may also be of differing thicknesses and may be straight. The partitions 70 may also be curved to define curved sub-cavities 60. The depths of the sub-cavities 60 may also differ within the individual cavities by altering the depth or shape of the cavity bottom 52. As with the cavities 50 the dimensions and configuration sub-cavities 60 may be adjustable if needed.

The structure may be configured into many shapes and embodiments. One particular embodiment contemplates a fan shroud or housing comprising cavities 50 as previously described being positioned on the inner surface of the shroud with the cavities 50 being open to the fluid flow produced by the fan. The surface 30 represented by the interior surface of the shroud may be positioned forward of the fan, aft of the fan or directly surrounding the fan. The structure 10 and surface 30 would be in the general shape of a ring with the cavities on the interior surface of the ring open to flow produced by a fan. The cavities would be tuned by L/D ratio, yaw, dimensions and configuration to reduce the noise levels as required. As with other, embodiments the cavities 50 would be individual separate from each other and not connected to a chamber or other instrumentality as is found in the prior art.

This system and method are simple and require no other necessary alterations or additional attachments of parts or equipment to a surface. The invention merely comprises properly positioned, oriented and dimensioned cavities (as described above) on the inside surface of a fan shroud or other surface over which the flow produced by a fan, rotating parts or any other generated fluid flow pass. The structure may be constructed of a wide variety of materials. Although the description above many specific embodiments, these should not be construed as limiting the scope of the structure, but as merely providing illustrations of present embodiments. Therefore, the scope of the structure should be determined by the appended claims and their legal equivalents, rather than by the examples presented.

Nomenclature
c local speed of sound within the freestream (m/s)
D depth of the cavity, along the transverse direction (mm)
E(f) spectral energy
$f_v$ vortex shedding frequency (Hz)
H boundary layer shape factor
L length of the cavity, the dimension along the major axis (mm)
$L_{x^*}$, $L_{y^*}$, $L_{z^*}$ characteristic working section dimensions in the X, Y, and Z directions (mm)
L/D cavity length to depth ratio
MSR magnitude$^2$ of the cavity transducer/magnitude$^2$ of boundary layer transducer
m integer value that identity the spectral peaks
$n_x$, $n_y$, $n_z$ acoustic mode number used in the duct resonance equation (n=1, 2, 3, . . . )
RSPL relative sound pressure level (dB)
$Re_\theta$ Reynolds number had on the momentum thickness
$St_s$ saturation Strouhal number based on the downstream distance ($f_v(X-X_\theta)/U_\infty$)
$St_\theta$ Strouhal number based on the momentum thickness ($f_v\theta/U_\infty$)
$U_\infty$ freestream velocity (m/s)
W width of the cavity, the dimension along the minor axis (mm)
L/W planform aspect
X, Y, Z streamwise, spanwise, and transverse spatial coordinates (mm)
$X_\theta$ virtual origin of the free shear layer (mm)
$X_s$ saturation distance of coherent vortical structures (mm)
δ boundary layer thickness defined by 99.5% of freestream velocity (mm)
δ* boundary layer displacement thickness (mm)
θ boundary layer momentum thickness (mm)

What is claimed is:

1. A structure for the reduction of noise in a fluid flow through the disruption of resonance caused by the fluid flow comprising a surface, wherein the surface is comprised of a top face over which the fluid flow passes, wherein the surface is further comprised of an array of at least two individual and discreet cavities, wherein the cavities are inset into the top face of the surface, wherein the cavities have a width along an axis of width, a length along an axis of length and a depth that projects beneath the top face of the surface, wherein a ratio exists between the length and the depth, wherein the ratio between the length and the depth is between 1 and 3 or between 8 and 10, wherein each of the cavities is defined by sides, a bottom and an opening opposite to the bottom with the opening being open to and under the fluid flow.

2. The structure of claim 1 wherein the axis of length of each of the cavities is individually aligned parallel to the direction of the fluid flow.

3. The structure of claim 1 wherein the axis of length of each of the cavities is individually yawed at a non-parallel angle in relation to the direction of the fluid flow.

4. The structure of claim 1 wherein the depth of the cavities is separately determined for each of the cavities.

5. The structure of claim 1 wherein the width axis of the cavities each is separately determined for each of the cavities.

6. The structure of claim 1 wherein the length axis of the cavities each is separately determined for each of the cavities.

7. The structure of claim 1 wherein the cavities are divided into sub-cavities by partitions within the cavities.

8. The structure of claim 7 wherein the sub-cavities are of unequal width, depth and length and wherein the partitions are of unequal width, depth and length.

9. The structure of claim 1 wherein the cavities have an orientation that is adjustable.

10. The structure of claim 7 wherein the sub-cavities have an orientation and dimensions that is adjustable.

11. The structure of claim 1 wherein the fluid flow is from a fan and the structure is a housing for a fan in the shape of a ring, wherein the housing is positioned around the fan in a manner that permits the flow to pass through the housing, wherein the surface of the structure is in contact with the flow, wherein the cavities are set into the surface and are open to the flow and wherein the cavities are positioned aft, forward or adjacent to the fan.

12. A cavity for the reduction of noise levels over which a fluid flows, comprising an open side being open to the fluid flow, a bottom, sides and partitions dividing the cavity into sub-cavities, wherein the cavity has a length, width and depth, wherein a ratio exists between the length and the depth and wherein the ratio between the length and the depth is between 1 and 3 or between 8 and 10.

13. The cavity of claim 12 wherein the sub-cavities are of differing dimensions in reference to each other.

14. The cavity of claim 12 wherein the sub-cavities are of differing shapes in reference to each other.

15. The cavity of claim 12 wherein the partitions are of differing dimensions in reference to each other.

16. The cavity of claim 12 wherein the cavity is inset into a surface of a structure over which the fluid flows, wherein the sub-cavities are open to the fluid flow.

17. A method for the reduction of noise in a fluid flow caused be resonance of the fluid flow comprising positioning an array of at least two cavities inset into a surface within a fluid flow in a manner where the flow passes over the cavities, wherein the cavities have a width along an axis of width, a length along an axis of length and a depth that projects beneath the top face of the surface wherein a ratio exists between the length and the depth, wherein the ratio between the length and the depth is between 1 and 3 or between 8 and 10, and wherein the depth of the cavities is defined by sides, a bottom and an opening opposite the bottom side the opening being open to and under the fluid flow.

18. The method of claim 17 wherein the cavities are dimensioned, angled and positioned in a manner to disrupt the resonance of specific frequencies of the fluid flow.

19. The method of claim 17 wherein the cavities are divided into sub-cavities.

20. The method of claim 17 wherein the fluid flow is produced by a fan.

* * * * *